United States Patent Office 3,454,024
Patented July 8, 1969

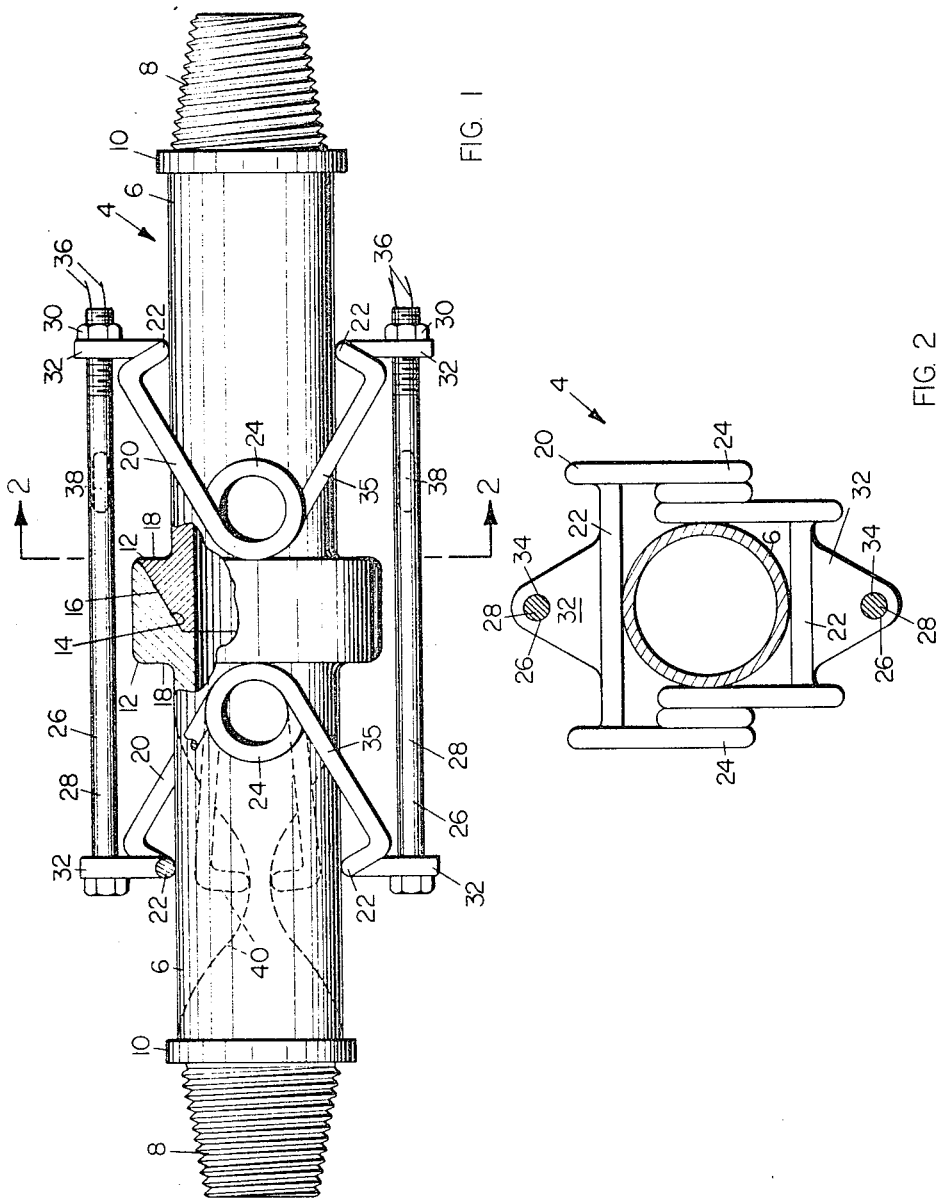

3,454,024
COUPLING AND VALVE ASSEMBLY
Edward E. McCullough, Brigham City, Utah, assignor to Thiokol Chemical Corporation, Bristol, Pa., a corporation of Delaware
Filed July 28, 1967, Ser. No. 656,713
Int. Cl. F16l 55/14; F16k 13/00
U.S. Cl. 137—68                                          3 Claims

ABSTRACT OF THE DISCLOSURE

A quickly-disconnectable coupling for two fluid-supply conduits that closes each conduit as it is disconnected. Detonation of explosive retaining means changes the function of two spring clamps from means for forcing the ends of the conduits together to means for simultaneously closing each disconnected end.

---

This invention relates to couplings and valves for fluid-supply conduits; and, more particularly, it relates to a quickly disconnectable coupling that simultaneously closes each conduit as it is disconnected.

It is frequently necessary, as in the case of fluid-conveying conduits connected to rockets in preparation for firing, to disconnect such a conduit very quickly and simultaneously to close both ends thereof. Most devices of this nature are fairly complex in design and, therefore, expensive.

It is accordingly an object of this invention to provide a coupling and valve assembly that can be actuated from a point remote therefrom to disconnect two segments of a fluid supply conduit and simultaneously to seal the ends of said segments.

Another object of this invention is to provide a severable, self-sealing coupling that is uncomplicated in design and thus inexpensive to manufacture.

The aforesaid and other objects of the invention are attained through a coupling and valve assembly, having spring clamps operable by explosive means, that is described hereinafter and illustrated in the accompanying drawings, wherein the same parts are designated with the same numbers throughout the disclosure.

In the drawings:
FIGURE 1 is a side view of the invention; and
FIGURE 2 is a cross-sectional view taken on the line 2—2 of FIGURE 1.

A preferred embodiment of the coupling and valve assembly 4, as shown in the figures, includes two short, flexible tubes 6, each having a connecting means 8 on the outer end 10 thereof for connection to a fluid-conveying conduit not shown. In this embodiment, the connecting means 8 is an externally-threaded screw connection. Each tube 6 is also equipped on the inner end thereof with an annular bearing member 12 that extends radially therefrom. One of the bearing members 12 has an internal, conical surface 14 and the other has an external, conical surface 16 that fits into the surface 14 for sealable and automatically alignable connection of the tubes 6 when opposing pressures are exerted on the bearing surfaces 18 of the bearing members 12, opposite the conical surfaces thereof. It is desirable that at least one of the surfaces 14 or 16 be made of a resilient material, such as soft rubber, that may expand into any imperfections in the adjacent surface to form a tight seal therewith. It is apparent that many other configurations could be used instead of the conical surfaces 14 and 16 to afford pressure-sealable connection for the tubes 6; for example, two annular, flat surfaces with one having a resilient, annular ridge thereon.

A spring clamp 20 having a pair of opposing jaws 22 attached to coil springs 24 biasing the jaws 22 toward each other is positioned on each tube 6, so that when released, the jaws 22 tend to close the tubes 6. Each of a pair of explosive retaining members 26 that span the bearing members 12, connects a corresponding jaw 22 of each clamp 20 together to restrain the clamps 20 in open positions about the tubes 6 and to force the coil springs 24 against their respective bearing members 12, thus exerting opposing pressures thereon to maintain the tubes 6 in sealed, aligned connection. Although the retaining members 26 could assume various forms, for example loops of explosive cord, in the preferred embodiment shown, they are explosive bolts 28 equipped with nuts 30. Each jaw 22 of the clamps 20 has an outwardly-projecting lug 32 fixed to it. An explosive bolt 28 is passed through one lug 32 of each clamp 20 and a nut 30 is tightened thereon until the desired amount of pressure is exerted by the springs 24 on the bearing surfaces 18. In some applications, it may be desired that the shanks 35 connecting the jaws 22 of the clamps 20 to the coil springs 24 thereof lie more nearly parallel to the bolts 28, so that a more positive pressure on the bearing surfaces 18 may be achieved by tightening the nuts 30 without relying entirely on the strength of the springs 24.

In typical operation, a fluid would be passed through fluid-conveying conduits, not shown, which are threadedly engaged to the screw connections 8, and through the tubes 6 to a rocket being prepared for firing. When a sufficient quantity of fluid has passed to the rocket, an electrical switch, not shown, is closed remotely to pass electrical energy through each pair of conductors 36 and detonate each explosive charge 38, shown in broken lines in the bolts 28. The force of the explosions, although little more than sufficient to sever each bolt 28, assists the weight of the conduits in immediate separation of the bearing members 12 of the tubes 6. Simultaneously, the jaws 22 of each clamp 20 are permitted to close upon its corresponding tube 6 to seal it effectively. This action of a released clamp 20 is shown in broken lines 40 on the left-hand tube 6 as illustrated in FIGURE 1.

An invention has been disclosed herein that is very simple in construction and operation and is useful in simultaneously closing and separating two fluid-conveying conduits, responsive to a remotely-generated signal.

What is claimed is:
1. A coupling and valve assembly for simultaneously closing and disconnecting two fluid-conveying conduits comprising:
   two short, flexible tubes, having connecting means on the outer ends thereof for connecting to said fluid-conveying conduits;
   an annular bearing member on the inner end of each said tube, extending radially therefrom, said members being sealably connectable for joining said tubes in alignment;
   a spring clamp on each of said tubes comprising a pair of opposing jaws and a spring connected thereto biasing said jaws toward each other so that, when released, said jaws will close said tubes, said springs being arranged to bear against said bearing members; and
   a pair of explosive retaining members, each spanning said bearing members to connect one said jaw of each said clamp together to restrain said clamps in open positions about said tubes and to cause said springs to exert opposing pressures on said bearing members to force said tubes tightly together in sealed alignment.

2. The coupling and valve assembly of claim 1 wherein said explosive retaining means are explosive bolts equipped with nuts and each of said jaws is equipped with a lug having a hole therein for engaging said bolts and nuts.

3. The coupling and valve assembly of claim 1 wherein one of said bearing members has an internal, divergent, conical surface concentric with said tube to which it is attached and the other said bearing member has an external, convergent conical surface that fits into said internal surface to align said tubes in sealed relationship, and at least one of said surfaces is formed of a resilient material.

References Cited

UNITED STATES PATENTS

| | | | |
|---|---|---|---|
| 1,397,481 | 11/1921 | Avery | 251—10 |
| 2,809,584 | 10/1957 | Smith | 285—3 XR |
| 3,273,578 | 9/1966 | Clark | 137—614 XR |

WILLIAM F. O'DEA, *Primary Examiner.*

RICHARD GERARD, *Assistant Examiner.*

U.S. Cl. X.R.

89—1; 137—614.02; 251—10